United States Patent
Wagner

(10) Patent No.: US 10,135,820 B2
(45) Date of Patent: *Nov. 20, 2018

(54) SERVER BASED BIOMETRIC AUTHENTICATION

(71) Applicant: Visa International Service Association, San Francisco, CA (US)

(72) Inventor: Kim Wagner, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/783,964

(22) Filed: Oct. 13, 2017

(65) Prior Publication Data

US 2018/0054436 A1 Feb. 22, 2018

Related U.S. Application Data

(63) Continuation of application No. 14/938,490, filed on Nov. 11, 2015, now Pat. No. 9,847,997.

(51) Int. Cl.
*H04L 29/00* (2006.01)
*H04L 29/06* (2006.01)
*G06F 21/32* (2013.01)

(52) U.S. Cl.
CPC .......... *H04L 63/0861* (2013.01); *G06F 21/32* (2013.01); *H04L 63/0807* (2013.01); *H04L 63/0853* (2013.01)

(58) Field of Classification Search
CPC ............... H04L 63/0861; H04L 9/3231; H04L 63/0823; H04L 9/0866; H04L 9/30
See application file for complete search history.

(56) References Cited

U.S. PATENT DOCUMENTS 8,972,742 B2 3/2015 Pastoriza et al.
2006/0239511 A1 10/2006 White et al.
(Continued)

FOREIGN PATENT DOCUMENTS

JP         4736744 B2    7/2011
KR    10-2012-075700 A   7/2012

OTHER PUBLICATIONS

Blanton, Marina et al., "Secure and Oblivious Maximum Bipartite Matching Size Algorithm with Applications to Secure Fingerprint Identification", Department of Computer Science and Engineering University of Notre Dame, 2014, 24 pages.
(Continued)

*Primary Examiner* — Ghazal B Shehni
(74) *Attorney, Agent, or Firm* — Kilpatrick Townsend & Stockton LLP

(57) ABSTRACT

A server-side biometric authentication system is disclosed that can split data knowledge and processes, so that extensive collusion would be required in order for a fraudster to compromise the system. Biometric data provided by a user during authentication can be matched with a combination of pieces of a biometric template stored across two or more server(s), rather than on a consumer device as is typically done. More specifically, at the time of enrollment, a biometric template can be split into two or more fragments. Each of the fragments can be encrypted and stored on a template storage server. At a later point in time, during authentication, biometric data provided by a user (e.g., from a fingerprint) can be compared against a reconstructed version of the biometric template where each fragment of the template is retrieved from a matcher computer and combined together.

20 Claims, 6 Drawing Sheets

(56) References Cited

U.S. PATENT DOCUMENTS

2009/0300737 A1 12/2009 Crandell
2012/0169463 A1 7/2012 Shin et al.
2015/0007295 A1 1/2015 Hou et al.

OTHER PUBLICATIONS

Upmanyu, Maneesh et al., "Blind Authentication: A Secure Crypto-Biometric Verification Protocol", IEEE Transactions on Information Forensics and Security, vol. 5, No. 2, Jun. 2010, pp. 255-267.
Shamir, Adi, "How to Share a Secret", Communications of the ACM, Nov. 1979, vol. 22, No. 11, pp. 612-613.
Boldyreva, Alexandra et al., "Order-Preserving Symmetric Encryption", Georgia Institute of Technology, located at http://www.cc.gatech.edu/~abohlyre/papers/bcdo.pdf, 24 pages, 2009.
Upmanyu, Maneesh et al., "Efficient Biometric Verification in Encrypted Domain", Springer-Verlag, Berlin Heidelberg, 2009, pp. 899-908.
Uludag, Umut et al. "Biometric Cryptosystems: Issues and Challenges", Proceedings of the IEEE, vol. 92, No. 6, pp. 948-960, Jun. 2004.
Jain, Anil K. et al., "Biometric Template Security: Challenges and Solutions", Proceedings of European Signal Processing Conference (EUSIPCO), Sep. 2005, 4 pages.
International Search Report dated Jan. 3, 2017, PCT Application No. PCT/US2016/053187 (16 pages).

SERVER BASED BIOMETRIC AUTHENTICATION

CROSS-REFERENCES TO RELATED APPLICATIONS

This application is a continuation of U.S. patent application Ser. No. 14/938,490, filed Nov. 11, 2015 entitled "SERVER BASED BIOMETRIC AUTHENTICATION", the disclosure of which is hereby incorporated by reference for all purposes.

Fraud in the consumer transaction service industry is a problem. For instance, lately, many consumer transactions may be completed using a consumer device (e.g., mobile phone) without the use of a physical payment card. A user may initiate a payment transaction from a consumer device at a point-of-sale terminal or in a remote payment environment. Some consumer device initiated transactions without a physical payment card may require biometric authentication to verify the identity of the payment user. However, in some cases a forger can duplicate the user biometric and complete a fraudulent transaction using the payment card details of the payment user.

Some systems attempt to decrease fraud in transactions where biometric authenticated is used by performing matching of the biometric data in the encrypted domain. For example, a biometric template (e.g., based on fingerprint) can be encrypted and the matching of that template to received biometric data can be done without decrypting the template, making it harder for fraudsters to comprise the biometric data. However, one major issue with this approach is that usual methods of encryption map plaintexts to ciphertexts that appear completely random. Even if the content of two plaintexts are very close together, their corresponding ciphertexts can be arbitrary strings and their content far apart. Thus, these systems would interpret that this biometric data originated from two different users, when in fact they could have originated from the same user.

Embodiments of the invention address these and other problems.

BRIEF SUMMARY

In some embodiments of the invention, systems and methods for server-side biometric authentication are provided. The server-side biometric authentication system can split data knowledge and processes, so that extensive collusion would be required in order for a fraudster to compromise the system. Biometric data provided by a user during authentication can be matched with a biometric template on a server(s), rather than on a consumer device as is typically done. More specifically, at the time of enrollment, a biometric template can be split into two or more fragments. Each of the fragments can be encrypted and stored on a template storage server. At a later point in time, during authentication, biometric data provided by a user (e.g., from a fingerprint) can be compared against a reconstructed version of the biometric template where each fragment of the template is retrieved from a matcher computer and combined together.

Some embodiments of the invention are directed to a method for biometric authentication including receiving, by an identity (ID) manager computer and from a resource providing entity computer, user identifying information associated with a user. The method may also include transmitting, by the ID manager computer, the user identifying information to an ID splitting computer. The method may further include in response to transmitting the user identifying information to the ID splitting computer, receiving, by the ID manager computer and from the ID splitting computer, a first user identifier and a second user identifier, wherein the first user identifier and the second user identifier are associated with the user identifying information. The method may also include transmitting, by the ID manager computer, the first user identifier to a first template storage computer, wherein the first template storage computer matches the first user identifier to a first fragment of a biometric template associated with the user and transmits the first fragment of the biometric template to a matcher computer. The method may further include transmitting, by the ID manager computer, the second user identifier to a second template storage computer, wherein the second template storage computer matches the second user identifier to a second fragment of the biometric template associated with the user and transmits the second fragment of the biometric template to the matcher computer. In some embodiments, the matcher computer combines the first fragment of the biometric template and the second fragment of the biometric template to determine whether biometric data provided by the user, received by the matcher computer and from the resource providing entity computer, matches the combined biometric template.

In some embodiments, the method may also include transmitting, by the ID manager computer, a transaction identifier to the resource providing entity computer, the first template storage computer, and the second template storage computer, wherein the determining whether the biometric data provided by the user matches the combined biometric template is based at least in part on the transaction identifier received by the resource providing entity computer matching the transaction identifier received by the first and second template storage computers.

In some embodiments, the first fragment of the biometric template may be stored on the first template storage computer and the second fragment of the biometric template is stored on the second template storage computer.

In some embodiments, matching the first user identifier to the first fragment of the biometric template is based at least in part on a first random number associated with both the first user identifier and the first fragment of the biometric template, and wherein matching the second user identifier to the second fragment of the biometric template is based at least in part on a second random number associated with both the second user identifier and the second fragment of the biometric template.

In some embodiments, the user identifying information comprises at least one of a primary account number (PAN), token, name, address, phone number, or e-mail address.

In some embodiments, the biometric data provided by the user may comprise at least one of a voice sample, fingerprint, iris scan, hand geometry, earlobe geometry, or deoxyribonucleic acid (DNA) scan.

In some embodiments, the method may also include receiving, by the ID manager computer and from the first server computer, a third user identifier associated with the user identifying information. The method may further include transmitting, by the ID manager computer, the third user identifier to the matcher computer, wherein the matcher computer matches the third user identifier to a third fragment of the biometric template associated with the user and transmits the third fragment of the biometric template to the matcher computer.

Some embodiments of the invention are directed to a method for biometric authentication receiving, by a matcher computer and from a resource providing entity computer, biometric data provided by a user. The method may also include receiving, by the matcher computer and from a first template storage computer, a first fragment of a biometric template. The method may further include receiving, by the matcher computer and from the second template storage computer, a second fragment of the biometric template. The method may additionally include combining, by the matcher computer, the first fragment of the biometric template and the second fragment of the biometric template. The method may also include determining whether the biometric data provided by the user matches the combined biometric template based at least in part on a transaction identifier received from the resource providing entity computer matching a transaction identifier received by a first template storage computer and a transaction identifier received by a second template storage computer.

In some embodiments, the method also includes transmitting, by the matcher computer, a result of the determining step to the resource providing entity computer.

Other embodiments of the invention are directed to servers and systems that are configured to perform the above-described methods.

These and other embodiments of the invention are described in further detail below.

DETAILED DESCRIPTION

Figure 1:
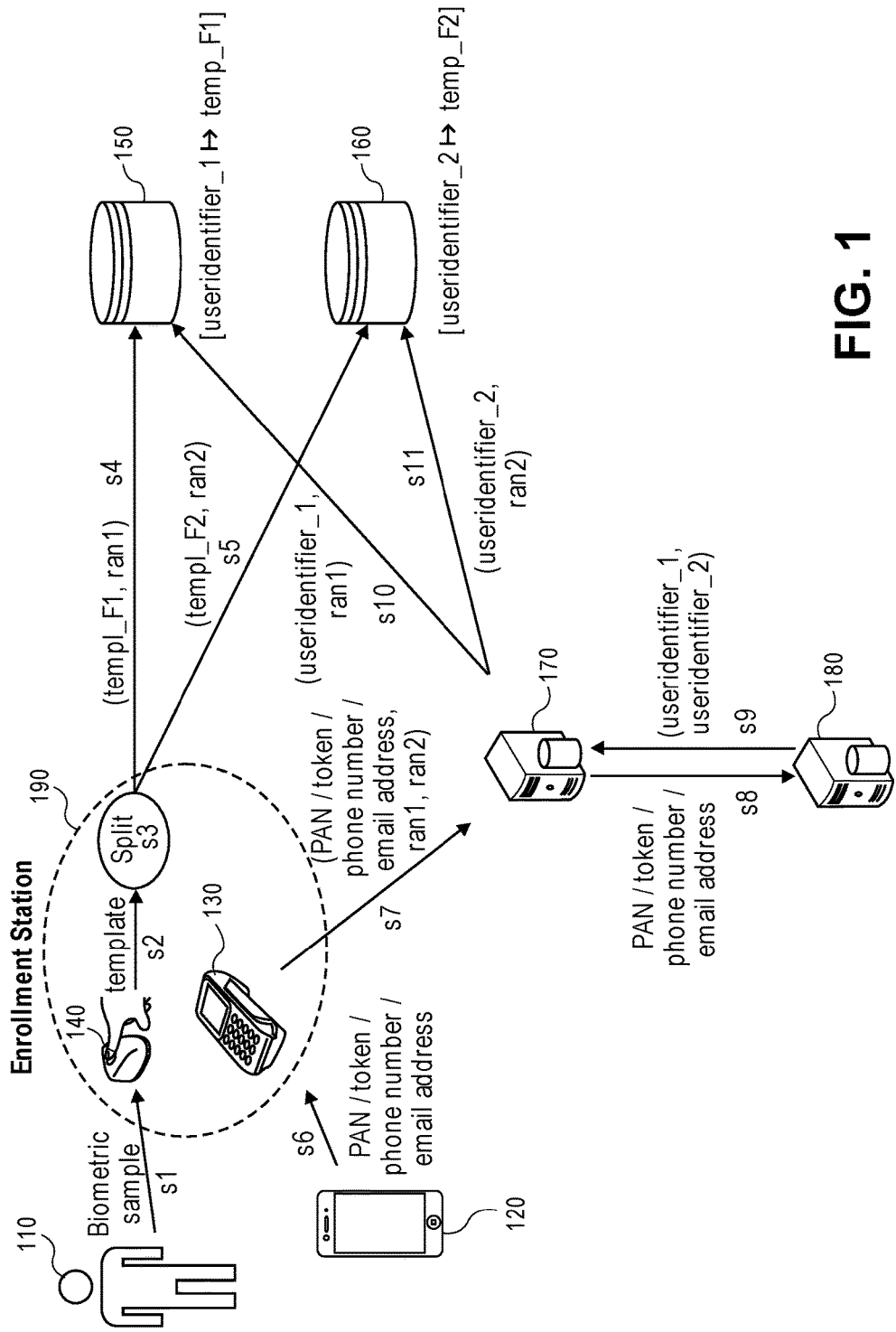
FIG. 1 shows a diagram illustrating an enrollment process with the server-side biometric authentication system, in accordance with some embodiments of the invention.

Prior to discussing embodiments of the invention, descriptions of some terms may be helpful in understanding embodiments of the invention.

A "payment device" may include any suitable device capable of making a payment. For example, a payment device can include a card including a credit card, debit card, charge card, gift card, or any combination thereof. A payment device can be used in conjunction with a consumer device, as further defined below.

A "payment processing network" (e.g., VisaNet™) may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments system) which processes authorization requests and a Base II system which performs clearing and settlement services.

An "authorization request message" may be an electronic message that is sent to an authorization system such as a payment processing network and/or an issuer computer to request authorization for a transaction. An authorization request message is an example of a transaction message. An authorization request message according to some embodiments may comply with ISO 8583, which is a standard for systems that exchange electronic transaction information associated with a payment made by a consumer using a payment device or a payment account. The authorization request message may comprise a primary account number (PAN), expiration date, service code, CVV and other data from a payment device. In some embodiments of the invention, an authorization request message may include a payment token (e.g., a substitute or pseudo account number), an expiration date, a token presentment mode, a token requestor identifier, an application cryptogram, and an assurance level data. The payment token may include a payment token issuer identifier that may be a substitute for a real issuer identifier for an issuer. For example, the real issuer identifier may be part of a BIN range associated with the issuer. An authorization request message may also comprise additional data elements corresponding to "identification information" including, by way of example only: a service code, a CVV (card verification value), a dCVV (dynamic card verification value), an expiration date, etc.

An "authorization response message" may be an electronic message reply to an authorization request message generated by the authorization system. The authorization response message may include an authorization code, which may be a code that the authorization system returns in response to receiving an authorization request message (either directly or through the payment processing network). The authorization response message is received at the merchant's access device (e.g. POS terminal) and can indicate approval or disapproval of the transaction by the authorization system.

A "server computer" may be a powerful computer or cluster of computers. For example, the server computer can be a large mainframe, a minicomputer cluster, or a group of servers functioning as a unit. The server computer may be associated with an entity such as a payment processing network, a wallet provider, a merchant, an authentication cloud, an acquirer or an issuer. An identity (ID) manager computer, ID splitting computer, matcher computer, and template storage computer may all be examples of server computers.

An "access device" can include a device that allows for communication with a remote computer, and can include a device that enables a customer makes a payment to a merchant in exchange for goods or services. An access device can include hardware, software, or a combination thereof. Examples of access devices include point-of-sale (POS) terminals, mobile phones, tablet computers, laptop or desktop computers, etc.

"Biometric data" includes data that can be used to uniquely identify an individual based upon one or more intrinsic physical or behavioral traits. For example, biometric data may include fingerprint data and retinal scan data. Further examples of biometric data include digital photographic data (e.g., facial recognition data), deoxyribonucleic acid (DNA) data, palm print data, hand geometry data, and iris recognition data.

A "biometric template" can be a digital reference of distinct characteristics that have been extracted from a biometric sample provided by a user. Biometric templates are used during the biometric authentication process. Data from a biometric sample provided by a user at the time of authentication can be compared against the biometric template to determine whether the provided biometric sample closely matches the biometric template.

A "resource providing entity" can be any entity that provides resources during a transaction. For example, a resource providing entity can be a merchant.

"User identifying information" can be any information associated with a user and that can identify the user. User identifying information can include, but is not limited to, a primary account number (PAN), telephone, e-mail address, zip code, mailing address, photo identification, personal identification number (PIN), etc.

A "user identifier" can be any piece of data that can identify a user. The user identifier may be derived from user identifying information. User identifiers can also be split into multiple parts, where only a single part may not be enough to identify the user without the rest of the parts.

FIG. 1 shows a diagram illustrating an enrollment process with the server-side biometric authentication system, in accordance with some embodiments of the invention. As described above, the server-side biometric authentication system may allow for secure biometric authentication by splitting a biometric template into two or more fragments and then recombining the fragments prior to comparing the recombined biometric template against biometric data provided by a user. Since the matching is performed on the server-side, opposed to being performed on the client-side as is typical, extensive collusion on the part of a fraudster would be required in order to compromise the system and perform fraudulent authentication. The following description illustrates the process of enrolling biometric data with the server-side biometric authentication system, prior to biometric authentication taking place. The steps outline below can be performed in a sequence other than what is described.

At step s1, a user 110 may enroll with the server-side biometric authentication system by providing a biometric sample at an enrollment station 190. The enrollment station can be located within a wide variety of establishments, including but not limited to, a merchant store, bank, government branch, automated teller machine (ATM), or any other suitable location. The user 110 may provide his/her biometric sample by interacting with a biometric reader 140 at the enrollment station 190. In this example, the biometric reader 140 is depicted as a fingerprint scanner, but can other device capable of obtaining a biometric sample from the user 110. For example, the biometric reader 140 can be an iris scanner, hand scanner, ear scanner, voice scanner, DNA scanner, etc.

At step s2, the biometric reader 140 obtains the biometric sample from the user 110 (e.g., by scanning the user's fingerprint). Upon obtaining the biometric sample from the user 110, the biometric reader 140 may create a biometric template associated with the user 110. The biometric template may be a digital reference of distinct characteristics that have been extracted from a biometric sample. For example, in the case where the biometric sample is a fingerprint, the biometric template may contain the minutiae (or major features) of the fingerprint. The biometric template my serve as reference to compare with data received from a biometric sample provided by a user at the time of authentication, to determine whether the user is a genuine user.

At step s3, after the biometric reader 140 creates the biometric template, the biometric template may be split into two or more fragments. The biometric template may be split into the two or more fragments by the biometric reader 140 or by another computer system (not shown) present within the enrollment station 190. For example, as shown in the figure, the biometric template may be split into two fragments: templ_F1 and templ_F2. By splitting the biometric template into two fragments, knowledge of or access to one of one of the fragments (but not both) may give knowledge to the original biometric template. Thus, if a fraudster gained access to just one of the fragments, the fraudster may not be able to reproduce the original biometric template. In some embodiments, the biometric template can be split into two or more fragments using a Shamir's Secret Sharing algorithm, which can be generalized to an N of M scheme ($1 < N \leq M$) where the biometric template can be split into M parts, with N of those parts being necessary to recreate the original biometric template.

In addition to splitting the biometric template into two or more fragments, the biometric reader 140 or other computer system (not shown) within the enrollment station 190 may generate two or more large random numbers, where the number of large random numbers generated may equal the number of fragments the biometric template is split into. In some embodiments, the generated large random numbers may be large enough such that the likelihood of generating a random number in a subsequent enrollment process identical to a generated random number in a previous enrollment process may be very low. In some embodiments, the generated large random numbers may be 20 bytes each.

After the biometric template has been split into or more fragments and the random numbers have been generated, a fragment and number pair may be sent to two or more template storage computers. For example, in step s4, a first fragment of the biometric template (templ_F1) and a first generated random number (ran1) may be sent by the biometric reader 140 or other computer system (not shown) to a first template storage computer 150. Further, in step s5, a second fragment of the biometric template (templ_F2) and a second generated random number (ran2) may be sent by the biometric reader 140 or other computer system (not shown) to a second template storage computer 160. In some embodiments, the first template storage computer 150 and the second template storage computer 160 may be operated by different entities. In some embodiments, if the biometric template was split into N fragments, there may be N template storage computers within the server-side biometric authentication system, each template storage computer storing one of the N fragments and one of N generated random numbers.

At step s6, the user 110 may provide some user identifying information to an access device 130. The user identifying information can include, but is not limited to, a form of identification, a payment credential, a primary account number (PAN), a token, a phone number, or an e-mail address. For example, the user 110 may use his/her mobile device to present a payment credential to the access device 130. In some embodiments, step s6 may be performed contemporaneously to step s1. The access device 130 may then capture the user identifying information provided by the user 110.

Figure 5:
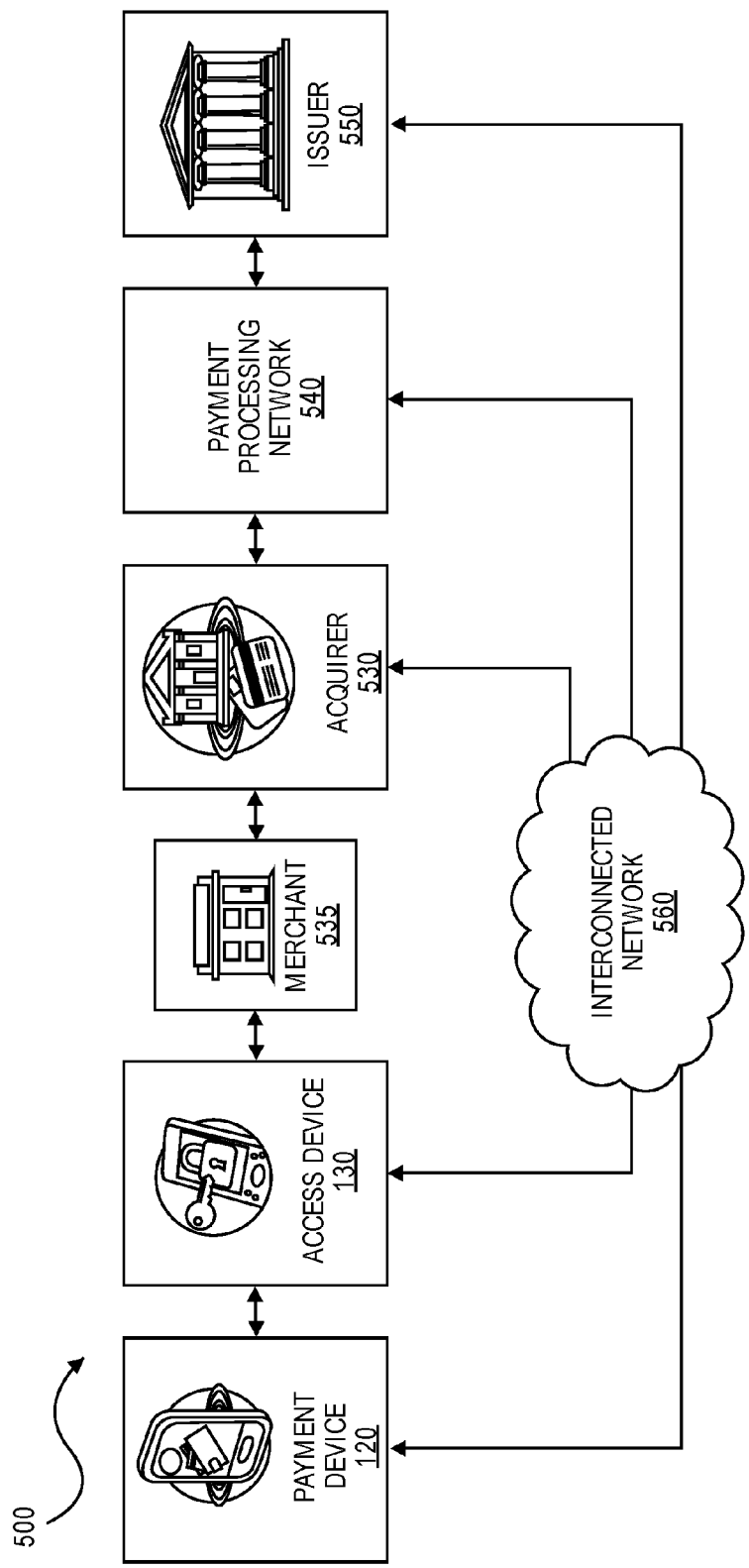
FIG. 5 shows a block diagram of an exemplary payment system, according to some embodiments of the invention.

At step s7, after capturing the user identifying information provided by the user 110, the access device 130 may transmit the captured user identifying information to an identity (ID) manager computer 170. Additionally, along with the user identifying information, the access device 130 may transmit the generated random numbers to the ID manager computer 170. For example, the access device 130 may transmit ran1 and ran2 to the ID manager computer 170. The access device may obtain, via a communication link, the generated random numbers from the biometric reader 140, or from the other computer system (not shown). The ID manager computer 170 may not receive any of the biometric data provided by the user 110 in step s1. In some embodiments, the ID manager computer 170 may reside within a payment processing network 540 (FIG. 5). In some embodiments, the ID manager computer 170 may be operated by a trusted third-party. In some embodiments, the biometric reader 140 and the access device 130 may be interconnected as part of one harmonious system such that the biometric reader 140 and the access device 130 have access to each other's data.

At step s8, after receiving the user identifying information, the ID manager computer 170 may transmit the user identifying information to an ID splitting computer 180. The ID splitting computer 180 may be responsible for splitting the user identifying information into multiple parts. In some embodiments, the ID splitting computer 180 may be operated by a trusted third-party.

At step s9, after receiving the user identifying information, the ID splitting computer 180 may split the user identifying information into multiple parts. In some embodiments, the ID splitting computer 180 may split the user identifying information into a number of parts equal to the number of biometric template fragments created. The purpose of splitting the user identifying information into multiple parts is that the multiple parts individually cannot identify the user 110, however a combination of the multiple parts can identify the user. In some embodiments, splitting the user identifying information may include generating two or more random numbers and associating the random numbers with the user identifying information. For example, if the ID splitting computer 180 receives user identifying information that it has not received before, the ID splitting computer 180 may generate two random numbers (e.g., useridentifier_1, and useridentifier_2). If the ID splitting computer 180 receives user identifying information that it has already received in the past, the ID splitting computer 180 may simply return the random numbers associated with that user identifying information instead of generating new random numbers. The generated random numbers may be stored within a database within the ID splitting computer 180. Further, from the figure, it can be seen that the ID splitting computer 180 never receives the random numbers generated from the enrollment station 190 (e.g., ran1 and ran2). Thus, the ID splitting computer 180 may not be able to correlate the received user identifying information to any particular transaction, increasing security even further.

After splitting the user identifying information into multiple parts (e.g., by generating multiple random numbers and associating them with the received user identifying information), the ID splitting computer 180 may transmit the multiple parts of the user identifying information back to the ID manager computer 170.

At step s10, after receiving the multiple parts of the user identifying information from the ID splitting computer 180, the ID manager computer 170 may transmit one of the parts of the user identifying information (e.g., useridentifier_1) and one of the random numbers generated in step s3 to one of the template storage computers. For example, the ID manager computer 170 may transmit useridentifier_1 and ran1 to the first template storage computer 150. Upon receiving useridentifier_1 and ran1 from the ID manager computer 170, the first template storage computer 150 may correlate useridentifier_1 with templ_F1 (the first fragment of the biometric template), since both pieces of information are associated with ran1. No other entity within the server-side biometric authentication system may deduce this correlation since the enrollment station 190 has not seen any of the parts of the user identifying information (e.g., useridentifier_1) and the ID manager computer 170 has not seen any of the fragments of the biometric template (e.g., templ_F1).

Similarly, in step s11, the ID manager computer 170 may transmit useridentifier_2 and ran2 to the second template storage computer 160. Upon receiving useridentifier_2 and ran2 from the ID manager computer 170, the second template storage computer 150 may correlate useridentifier_2 with templ_F2 (the first fragment of the biometric template), since both pieces of information are associated with ran2.

Upon receiving the respective parts of the user identifying information and one of the random numbers, first template storage computer 150 and second template storage computer 160 may each store a record that associates one of the fragments of the biometric template with one of the parts of the user identifying information. For example, first template storage computer 150 may store a record that associates useridentifier_1 to templ_F1 and second template storage computer 160 may store a record that associates useridentifier_2 to templ_F2. Thus, each of the template storage computers have an association of a part (e.g., fragment) of a user's identity to a fragment of a biometric template.

Any breach of the first template storage computer 150 or the second template storage computer 160 by a fraudster may only yield random numbers associated with other random numbers. Even if both the first template storage computer 150 and the second template storage computer 160 were breached by a fraudster, no association exists between the part of the user identifying information (e.g., useridentifier_1) stored in the first template storage computer 150 and the part of the user identifying information (e.g., useridentifier_2) stored in the second template storage computer 160. Thus, the fraudster would not have knowledge of which part of the user identifying information (e.g., useridentifier_1) stored in the first template storage computer 150 to combine with the part of the user identifying information (e.g., useridentifier_2) stored in the second template storage computer 160 to create a template.

Upon completing the enrollment process illustrating in FIG. 1, the user 110 may be able to use the server-side biometric authentication system to authenticate for a transaction at a later point in time.

Figure 2:
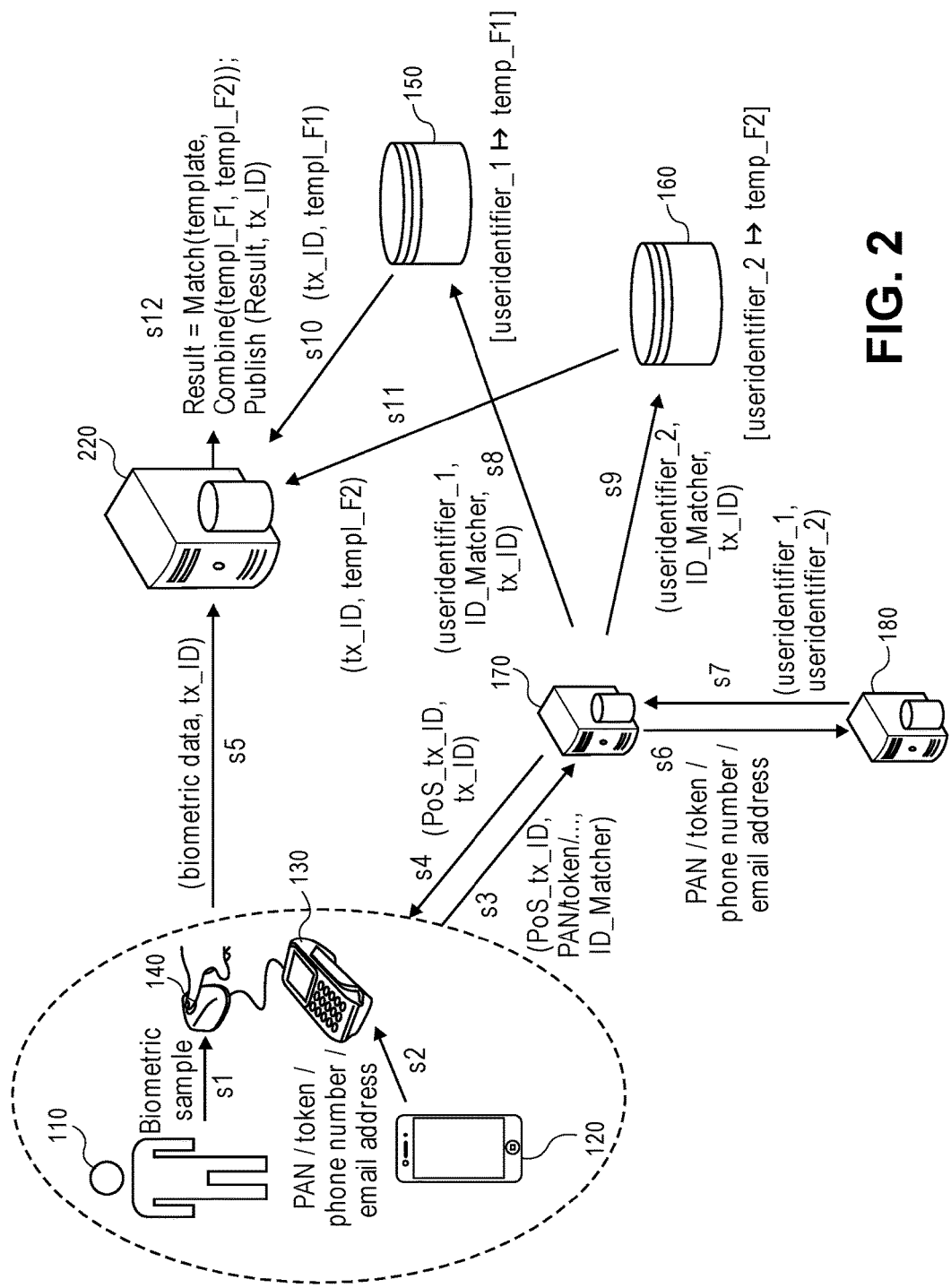
FIG. 2 shows a diagram illustrating an authentication process with the server-side biometric authentication system, in accordance with some embodiments of the invention.

FIG. 2 shows a diagram illustrating an authentication process with the server-side biometric authentication system, in accordance with some embodiments of the invention. The steps illustrated in FIG. 2 may occur at some point in time after the steps illustrated in FIG. 1 are carried out. For example, the steps illustrated in FIG. 2 may occur when a user wishes to authenticate with the server-side biometric authentication system for a transaction. The steps outline below can be performed in a sequence other than what is described.

At step s1, the user 110 may be at a merchant location and may wish to begin the process of being authenticated to complete a transaction. The user 110 may submit his/her biometric sample by interacting with the biometric reader 140. For example, the user 110 may provide his/her fingerprint to the biometric reader 140.

At step s2, the user 110 may provide some user identifying information to an access device 130. The user identifying information can include, but is not limited to, a primary account number (PAN), payment token, phone number, or e-mail address. For example, the user 110 may present a payment device 120 storing a PAN to the access device 130. Step s2 may be performed contemporaneously to step s1.

At step s3, after the user provides some user identifying information to the access device 130, the access device 130 may generate a point-of-sale (PoS) transaction ID (PoS_tx_ID) and transmit the PoS transaction ID, user identifying information, and an identifier of a matcher computer 220 (ID_Matcher) associated with the access device 130 or merchant, to the ID manager computer 170. The identifier of the matcher computer 220 can be a Uniform Resource Locator (URL) that points to the matcher computer 220. The transmission of the information from the access device 130 to the ID manager computer 170 may be encrypted with a public key of the ID manager computer 170. Alternatively, transport layer security (TLS) may be used where the ID manager computer 170 has authenticated, to ensure that the personally identifiable information (PII) data is only sent to a legitimate party.

At step s4, the ID manager computer 170 may generate a transaction ID (e.g., tx_ID) specific to the transaction taking place. The ID manager computer 170 may transmit the generated transaction ID along with the PoS transaction id (PoS_tx_ID) to the to the access device 130, such that the access device 130 is aware of which transaction ID to associate with the current transaction. The generated transaction ID may be a large random number, big enough that there probability of reusing the same transaction ID is greatly reduced. In some embodiments, the generated transaction ID may be 20 bytes in length.

At step s5, the biometric reader 140 and/or the access device 130 may transmit the transaction ID received from the ID manager computer 170 along with data pertaining to the currently provided biometric sample received by the biometric reader 140 to the matcher computer 220.

At step s6, the ID manager computer 170 may transmit the user identifying information, received in step s3, to the ID splitting computer 180. As described above with respect to FIG. 1, the ID splitting computer 180 may split the user identifying information into two or more parts (e.g., useridentifier_1 and useridentifier_2). As mentioned above, useridentifier_1 and useridentifier_2 may simply be random numbers generated and associated with the user identifying information. At step s7, after the ID splitting computer 180 splits the user identifying information into two or more parts, the ID splitting computer 180 may transmit the split parts of the user identifying information to the ID manager computer 170.

At step s8, after receiving the split parts of the user identifying information to the ID manager computer 170, the ID manager computer 170 may transmit a first part of the user identifying information (e.g., useridentifier_1, the identifier of the matcher computer 220, and the transaction ID to the first template storage computer 150. Similarly, at step s9, the ID manager computer 170 may transmit a second part of the user identifying information (e.g., useridentifier_2, the identifier of the matcher computer 220, and the transaction ID to the first template storage computer 150. The prats of the user identifying information, identifier of the matcher computer 220, and the transaction ID may be encrypted by a mutually authenticated TLS session.

At step s10, after the first template storage computer 150 receives the first part of the user identifying information (e.g., useridentifier_1, the identifier of the matcher computer 220, and the transaction ID, the first template storage computer 150 may match the received part of the user identifying information (e.g., useridentifier_1) to the first fragment of the biometric template stored during the enrollment process described with respect to FIG. 1. Upon matching the received part of the user identifying information to the first fragment of the biometric template stored within the first template storage computer 150, the first template storage computer 150 may transmit the received transaction ID (e.g., tx_ID) and first fragment of the biometric template (e.g., templ_F1) to the matcher computer 220. The first template storage computer 150 may know the identity of the matcher computer 220 based upon the identity of the matcher computer (e.g., ID_Matcher) received from the ID manager computer 170.

Similarly, at step s11, after the second template storage computer 160 receives the second part of the user identifying information (e.g., useridentifier_2, the identifier of the matcher computer 220, and the transaction ID, the second template storage computer 160 may match the received part of the user identifying information (e.g., useridentifier_2) to the second fragment of the biometric template stored during the enrollment process described with respect to FIG. 1. Upon matching the received part of the user identifying information to the second fragment of the biometric template stored within the template storage computer 150, the second template storage computer 160 may transmit the received transaction ID (e.g., tx_ID) and second fragment of the biometric template (e.g., templ_F2) to the matcher computer 220. The second template storage computer 150 may know the identity of the matcher computer 220 based upon the identity of the matcher computer (e.g., ID_Matcher) received from the ID manager computer 170.

At step s12, the matcher computer 220 may now use the transaction id (e.g., tx_ID) received from the access device 130 to associate the different transmissions received from the various entities. The matcher computer 220 may combine the two received fragments of the biometric template (e.g., templ_F1 and templ_F2) to create a combined biometric template that is a duplicate of the original biometric template generated at during the enrollment process described with respect to FIG. 1. The matcher computer 220 may then compare the combined biometric template to the biometric data obtained during the current authentication process. The matcher computer 220 may determine whether the biometric data obtained during the current authentication process matches the biometric template obtained during enrollment, and ultimately whether the current user 110 is a genuine user. If the matcher computer 220 determines that the biometric data obtained during the current authentication process matches the biometric template obtained during enrollment, the matcher computer 220 may publish a result of the match along with the transaction ID (e.g., tx_ID) on its website or blockchain. The access device 130 may then look up the result of the match on the website or blockchain using the transaction ID (e.g., tx_ID) and authenticate based on the obtained result. In some embodiments, the biometric data obtained during the current authentication process need not be an exact match of the biometric template obtained during enrollment. Rather the biometric data obtained during the current authentication process can be a "close-enough" match to the biometric template obtained during enrollment to result in a successful match.

As shown in the figure, the matcher computer 220 does not receive any user identifying information and the first and second template storage computers 150, 160 simply receive random numbers that may not be associated with a biometric template or with user identifying information. If a fraudster were able to eavesdrop on the incoming transmissions to the first and second template storage computers 150, 160, the fraudster would be able to recover fragments of biometric templates, but not associate them with any user identifying information. Thus, the fraudster would have worthless information and would be unable to compromise the server-side biometric authentication system.

The ID manager computer 170, ID splitting computer 180, first template storage computer 1500, second template storage computer 160, and the matcher computer 220 may be known entities that can use trusted TLS sessions between each other. In some embodiments, there may be more than one matcher computer 220 and more than one ID manager computer 170. A public key infrastructure (PKI) could be used to enable the mutually authenticated TLS sessions. Alternatively, or in addition, encryption with public keys may also be implemented.

Figure 3:
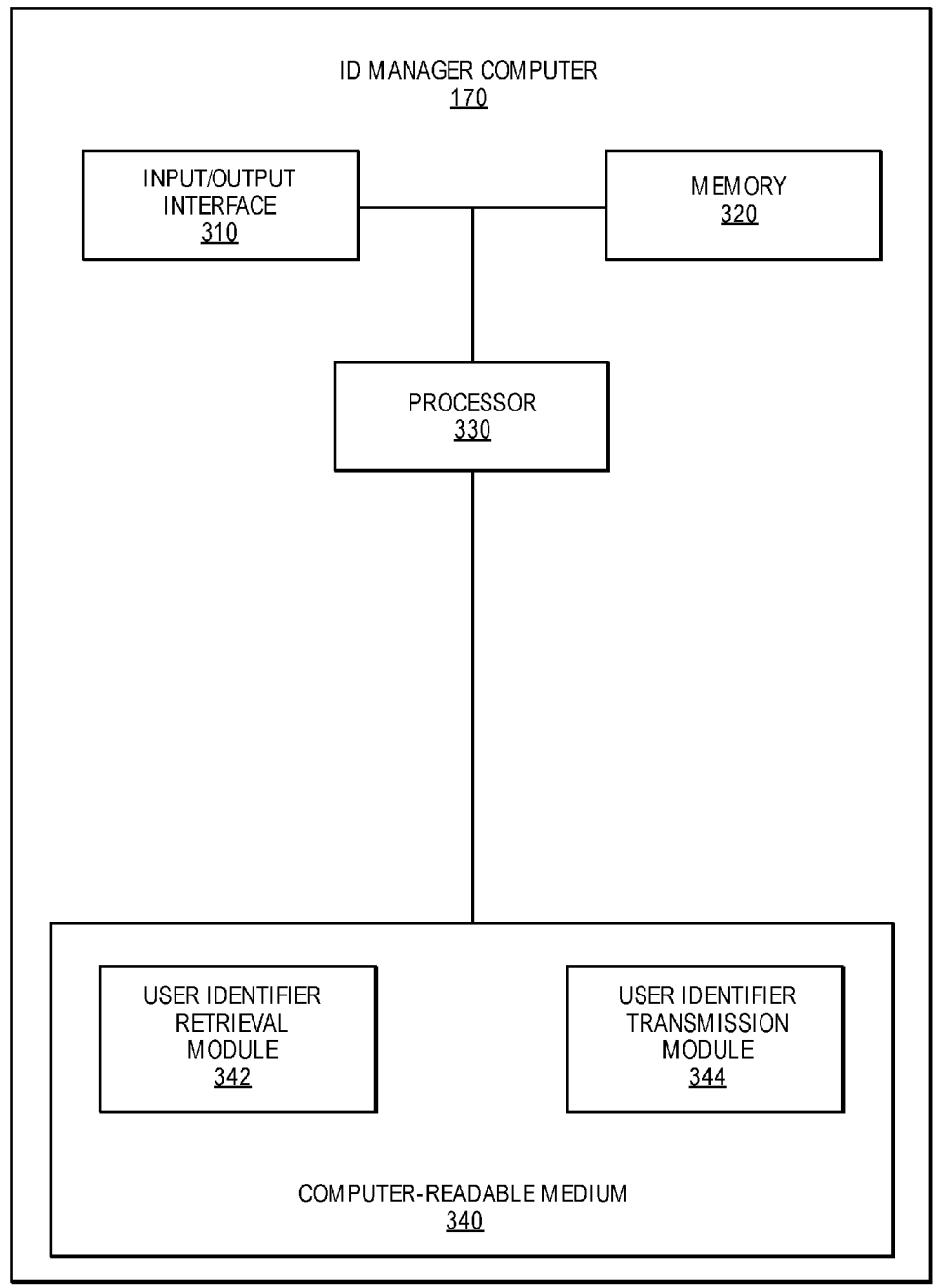
FIG. 3 shows a block diagram of an identity (ID) manager computer, in accordance with some embodiments of the invention.

FIG. 3 is a simplified block diagram of an ID manager computer 170, according to an embodiment of the present invention. ID manager computer 170 includes an input/output interface 310, a memory 320, a processor 330, and a computer-readable medium 340. In some embodiments, the ID manager computer 170 may reside within the server-side biometric authentication system described with respect to FIG. 1 and FIG. 2.

The input/output (I/O) interface 310 is configured to receive and transmit data. For example, the I/O interface 310 may receive the user identifying information from the access device 130 (FIG. 1). In another example, the I/O interface 310 may transmit the transaction ID to the access device 130 (FIG. 2), first template storage computer 150 (FIG. 2), and second template storage computer 160 (FIG. 2). The I/O interface 310 may also be used for direct interaction with the ID manager computer 170. The I/O interface 310 may accept input from an input device such as, but not limited to, a keyboard, keypad, or mouse. Further, the I/O interface may display output on a display device.

Memory 320 may be any magnetic, electronic, or optical memory. It can be appreciated that memory 320 may include any number of memory modules. An example of memory 320 may be dynamic random access memory (DRAM).

Processor 330 may be any general-purpose processor operable to carry out instructions on the ID manager computer 170. The processor 330 is coupled to other units of the ID manager computer 170 including input/output interface 310, memory 320, and computer-readable medium 340.

Computer-readable medium 340 may be any magnetic, electronic, optical, or other computer-readable storage medium. Computer-readable storage medium 340 includes user identifier retrieval module 342 and user identifier transmission module 344.

The user identifier retrieval module 342 may be configured to, when executed by processor 330, interface with the ID splitting computer 180 (FIG. 1) to facilitate retrieval of the parts of the user identifying information. The user identifier retrieval module 342 may facilitate receipt of the user identifying information from the access device 130 (FIG. 1). After receiving the user identifying information from the access device 130 (FIG. 1), the user identifier retrieval module 342 may transmit the received user identifying information to the ID splitting computer 180 (FIG. 1). The user identifier retrieval module 342 may then facilitate receipt of the two or more parts of the user identifying information (e.g., useridentifier_1 and useridentifier_2) from the ID splitting computer 180 (FIG. 1). The user identifier retrieval module 342 may facilitate the various transmitting and receiving of data by interfacing with the I/O interface 310.

The user identifier transmission module 344 may be configured to, when executed by processor 330, interface with the first and second template storage computers 150, 160 (FIG. 1) to transmit the parts of the user identifying information. Once the ID manager computer 170 has received the two or more parts of the user identifying information from the ID splitting computer 180 (FIG. 1), the user identifier retrieval module 342 may facilitate transmission of one of the parts of the user identifying information to each of the template storage computers. For example, the user identifier retrieval module 342 may facilitate transmission of the first part of the user identifying information (e.g., useridentifier_1) to the first template storage computer 150 (FIG. 1) and the second part of the user identifying information (e.g., useridentifier_2) to the second template storage computer 160 (FIG. 2). The user identifier transmission module 344 may facilitate the various transmitting and receiving of data by interfacing with the I/O interface 310.

Figure 4:
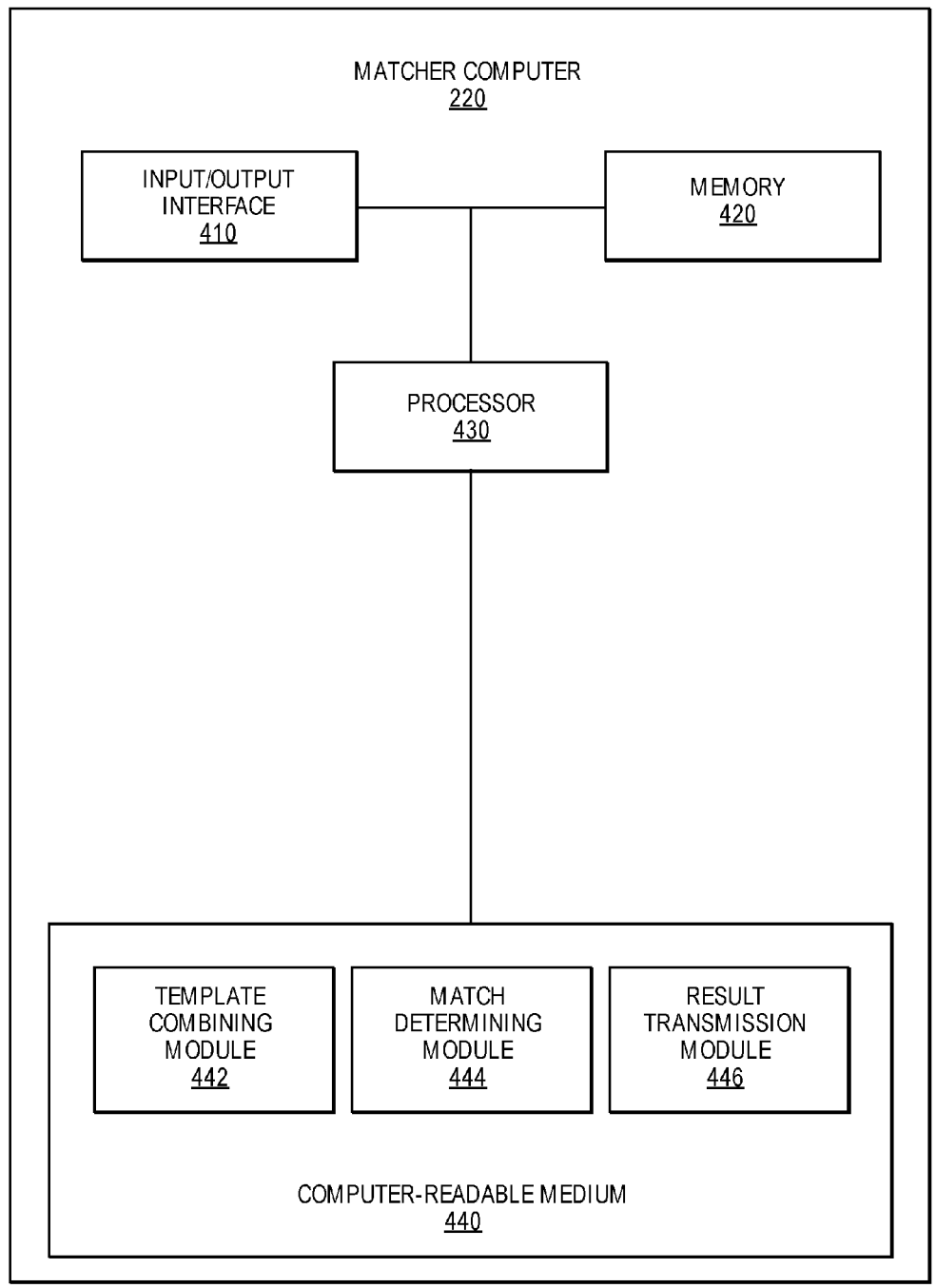
FIG. 4 shows a block diagram of a matcher computer, in accordance with some embodiments of the invention.

FIG. 4 is a simplified block diagram of a matcher computer 220, according to an embodiment of the present invention. Matcher computer 220 includes an input/output interface 410, a memory 420, a processor 430, and a computer-readable medium 440. In some embodiments, the matcher computer 220 may reside within the server-side biometric authentication system described with respect to FIG. 2.

The input/output (I/O) interface 310 is configured to receive and transmit data. For example, the I/O interface 310 may receive the various fragments of the biometric template from each of the template storage computers in FIG. 2. In another example, the I/O interface 310 may receive the transaction ID (e.g., tx_ID) and current biometric data from the biometric reader 140 (FIG. 2) and/or the access device 130 (FIG. 2). The I/O interface 310 may also be used for direct interaction with the matcher computer 220. The I/O interface 310 may accept input from an input device such as, but not limited to, a keyboard, keypad, or mouse. Further, the I/O interface may display output on a display device.

Memory 320 may be any magnetic, electronic, or optical memory. It can be appreciated that memory 320 may include any number of memory modules. An example of memory 320 may be dynamic random access memory (DRAM).

Processor 330 may be any general-purpose processor operable to carry out instructions on the match computer 220. The processor 330 is coupled to other units of the matcher computer 220 including input/output interface 310, memory 320, and computer-readable medium 340.

Computer-readable medium 340 may be any magnetic, electronic, optical, or other computer-readable storage medium. Computer-readable storage medium 340 includes template combining module 442, match determining module 444, and result transmission module 446.

The template combining module 442, when executed by processor 430, may be configured to facilitate combining of multiple fragments of a biometric template to create a combined biometric template. The template combining module 422 may facilitate receipt, via I/O interface 410, of the multiple fragments of the biometric template from the various template storage computers. For example, the template combining module 442 may facilitate receipt of the first fragment of the biometric template from the first template storage computer 150 (FIG. 2) and receipt of the second fragment of the biometric template from the second template storage computer 160 (FIG. 2). Upon receipt of the various multiple fragments of the biometric template, the template combining module 442 may facilitate combining of the various multiple fragments of the biometric template to create a combined biometric template that reflects the original biometric template generated upon enrollment. The manner in which the multiple fragments of the biometric template are combined may be according to a particular algorithm.

The match determining module 444, when executed by processor 430, may be configured to determine whether a match exists between the combined biometric template combined by the template combining module 442 and biometric data provided by the user in the current authentication session. Determining whether a match exists between the combined biometric template combined by the template combining module 442 and biometric data provided by the user in the current authentication session may be according to a particular algorithm.

The result transmission module 446, when executed by processor 430, may be configured to publish a result of the match determined by the match determining module 444 to a website or a blockchain. Alternatively, in some embodiments, the result transmission module 446 may transmit the result to the access device 130 (FIG. 1).

FIG. 5 shows a block diagram of a typical transaction processing system 500. The system 500 may include a payment device 120, an access device 130, a merchant computer 535, an acquirer computer 530, a payment processing network computer 540, and an issuer computer 550. In some implementations, different entities in FIG. 5 may communicate with each other using one or more communication networks such as the Internet, a cellular network, a TCP/IP network or any other suitable communication network. Note that one or more entities in the system 500 may be associated with a computer apparatus that may be implemented using some of the components as described with reference to FIG. 6.

The payment device 120 may be associated with a payment account of a user. In some implementations, the payment device 120 may be a mobile device such as a mobile phone, a tablet, a PDA, a notebook, a key fob or any suitable mobile device. In some embodiments, the payment device 120 may be a wearable device such as, but not limited to, a smart watch, a fitness band, an ankle bracelet, a ring, earrings, etc. For example, the payment device 120 may include a virtual wallet or a payment application that may be associated with one or more payment accounts of the user. In some implementations, the payment device 120 may be capable of communicating with the access device 130 using a wireless data protocol such as Wi-Fi™ or Bluetooth™. For example, the payment device 120 may interact with the access device 130 by establishing a connection with the access device 130 using a wireless data protocol. In some embodiments, the payment device 120 may be a plastic card linked to a user account.

The access device 130 may be an access point to a transaction processing system that may comprise the acquirer computer 530, the payment processing network computer 540, and the issuer computer 550. In some implementations, the access device 130 may be associated with or operated by the merchant computer 535. For example, the access device 130 may be a point of sale device that may include a contactless reader, an electronic cash register, a display device, etc. In some implementations, the access device 130 may be configured to transmit information pertaining to one or more purchased items at a merchant 535 to an acquirer 530 or payment processing network 540. In some implementations, the access device 130 may be a personal computer that may be used by the user to initiate a transaction with the merchant computer 525 (e.g., an online transaction). In some implementations, the access device may be configured to interface with a biometric reader to obtain biometric data pertaining to a biometric sample provided by a user.

The acquirer computer 530 may be operated by an acquirer. The acquirer is typically a system for an entity (e.g., a bank) that has a business relationship with a particular merchant, a wallet provider or another entity. The acquirer computer 530 may be communicatively coupled to the merchant computer 535 and the payment processing network 540 and may issue and manage a financial account for the merchant. The acquirer computer 530 may be configured to route the authorization request for a transaction to the issuer computer 550 via the payment processing network computer 540 and route an authorization response received via the payment processing network computer 540 to the merchant computer 535.

The payment processing network computer 540 may be configured to provide authorization services, and clearing and settlement services for payment transactions. The payment processing network computer 540 may include data processing subsystems, wired or wireless networks, including the internet. An example of the payment processing network computer 540 includes VisaNet™, operated by Visa®. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. The payment processing network computer 540 may include a server computer. In some implementations, the payment processing network computer 540 may forward an authorization request received from the acquirer computer 530 to the issuer computer 550 via a communication channel. The payment processing network computer 540 may further forward an authorization response message received from the issuer computer 550 to the acquirer computer 530. In some implementations, the payment processing network 540 may operate the ID manager computer 170 (FIG. 1).

The issuer computer 550 may represent an account issuer and/or an issuer processor. Typically, the issuer computer 550 may be associated with a business entity (e.g., a bank) that may have issued an account and/or payment card (e.g., credit account, debit account, etc.) for payment transactions. In some implementations, the business entity (bank) associated with the issuer computer 550 may also function as an acquirer (e.g., the acquirer computer 530).

The issuer computer 550 and/or the payment processing network computer 540 may operate as authorization systems in some embodiments of the invention. For example, a transaction may be authorized by the issuer computer 550 and/or the payment processing network computer 540 upon successful biometric authentication by the user with the server-side biometric authentication system disclosed herein.

The various entities in the system 500 may communicate with each other via an interconnected network 560, e.g., the Internet.

The various participants and elements described herein with reference to FIGS. 1-5 may operate one or more computer apparatuses to facilitate the functions described herein. Any of the elements in FIGS. 1-5, including any servers or databases, may use any suitable number of subsystems to facilitate the functions described herein.

Figure 6:
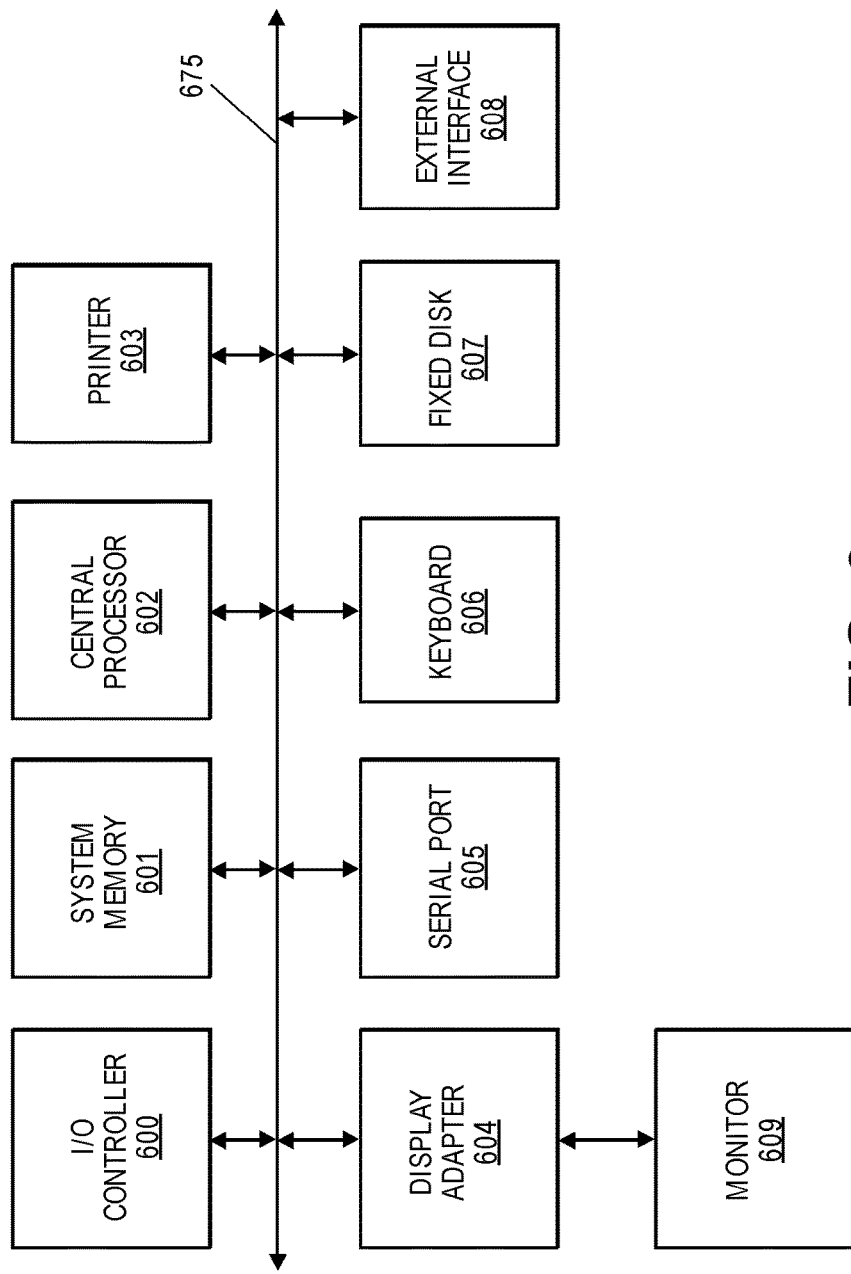
FIG. 6 shows exemplary computer apparatus, in accordance with some embodiments of the invention.

Examples of such subsystems or components are shown in FIG. 6. The subsystems shown in FIG. 6 are interconnected via a system bus 675. Additional subsystems such as a printer 603, keyboard 606, fixed disk 607 (or other memory comprising computer readable media), monitor 609, which is coupled to display adapter 604, and others are shown. Peripherals and input/output (I/O) devices, which couple to I/O controller 600 (which can be a processor or other suitable controller), can be connected to the computer system by any number of means known in the art, such as serial port 605. For example, serial port 605 or external interface 608 can be used to connect the computer apparatus to a wide area network such as the Internet, a mouse input device, or a scanner. The interconnection via system bus allows the central processor 602 to communicate with each subsystem and to control the execution of instructions from system memory 601 or the fixed disk 607, as well as the exchange of information between subsystems. The system memory 601 and/or the fixed disk 607 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method, comprising:
   receiving, at an enrollment computer and from a user, a biometric sample and user identifying information associated with the user;
   generating, by the enrollment computer, a biometric template based on biometric sample;
   splitting, by the enrollment computer, the biometric template into a first fragment of the biometric template and a second fragment of the biometric template;
   generating, by the enrollment computer, a first random number associated with the first fragment of the biometric template and a second random number associated with the second fragment of the biometric template, wherein the first random number is different than the second random number;
   transmitting, by the enrollment computer and to a first template storage computer, the first random number and the first fragment of the biometric template;
   transmitting, by the enrollment computer and to a second template storage computer, the second random number and the second fragment of the biometric template; and
   providing, by the enrollment computer, the user identifying information, the first random number and the second random number to an identity (ID) manager computer, which passes the user identifying information to an ID splitting computer, wherein the ID splitting computer
   generates from the user identifying information a first user identifier and a second user identifier, wherein the first user identifier is different than the second user identifier, and transmits
   to the identity (ID) manager computer, the first user identifier and the second user identifier, wherein the identity (ID) manager computer transmits the first user identifier and the first random number to the first template storage computer and transmits the second user identifier and the second random number to the second template storage computer, and wherein the first template storage computer correlates the first user identifier with the first fragment of the biometric template based on the first random number and the second template storage computer correlates the second user identifier with the second fragment of the biometric template based on the second random number.

2. The method of claim 1, wherein the biometric sample comprises at least one of a voice sample, fingerprint, iris scan, hand geometry, earlobe geometry, or deoxyribonucleic acid (DNA) scan.

3. The method of claim 1, wherein:
   correlating the first user identifier with the first fragment of the biometric template comprises storing, in a database, a first record associating the first user identifier to the first fragment of the biometric template; and
   correlating the second user identifier with the second fragment of the biometric template comprises storing, in the database, a second record associating the second user identifier to the second fragment of the biometric template.

4. The method of claim 1, wherein the user identifying information comprises at least one of a primary account number (PAN), token, name, address, phone number, or e-mail address.

5. The method of claim 1, further comprising:
   splitting, by the enrollment computer, the biometric template into a third fragment of the biometric template;
   generating, by the enrollment computer, a third random number associated with the third fragment of the biometric template; and
   transmitting, by the enrollment computer and to a third template storage computer, the third random number and the third fragment of the biometric template.

6. The method of claim 1, wherein the enrollment computer is an access device.

7. The method of claim 1, wherein:
   during a user authentication step, the first fragment of the biometric template is retrieved, by a matcher computer, from the first template storage computer and the second fragment of the biometric template is retrieved, by the matcher computer, from the second template storage computer; and
   wherein the first fragment of the biometric template and the second fragment of the biometric template is combined, by the matcher computer, to determine whether the combined biometric template matches biometric data provided by the user.

8. A computer device, comprising:
a processor; and
a non-transitory computer readable medium, the non-transitory computer readable medium comprising computer executable code for executing a method, the method comprising:
   receiving, from a user, a biometric sample and user identifying information associated with the user;
   generating a biometric template based on biometric sample;
   splitting the biometric template into a first fragment of the biometric template and a second fragment of the biometric template;
   generating a first random number associated with the first fragment of the biometric template and a second random number associated with the second fragment of the biometric template, wherein the first random number is different than the second random number;
   transmitting, to a first template storage computer, the first random number and the first fragment of the biometric template;
   transmitting, to a second template storage computer, the second random number and the second fragment of the biometric template; and
   providing, by the computing device, the user identifying information, the first random number and the second random number to an identity (ID) manager computer, which passes the user identifying information to an ID splitting computer, wherein the ID splitting computer
   generates from the user identifying information a first user identifier and a second user identifier, wherein the first user identifier is different than the second user identifier, and transmits
   to the identity (ID) manager computer, the first user identifier and the second user identifier, wherein the identity (ID) manager computer transmits the first user identifier and the first random number to the first template storage computer and transmits the second user identifier and the second random number to the second template storage computer, and wherein the first template storage computer correlates the first user identifier with the first fragment of the biometric template based on the first random number and the second template storage computer correlates the second user identifier with the second fragment of the biometric template based on the second random number.

9. The computer device of claim 8, wherein the biometric sample comprises at least one of a voice sample, fingerprint, iris scan, hand geometry, earlobe geometry, or deoxyribonucleic acid (DNA) scan.

10. The computer device of claim 8, wherein:
   correlating the first user identifier with the first fragment of the biometric template comprises storing, in a database, a first record associating the first user identifier to the first fragment of the biometric template; and
   correlating the second user identifier with the second fragment of the biometric template comprises storing, in the database, a second record associating the second user identifier to the second fragment of the biometric template.

11. The computer device of claim 8, wherein the user identifying information comprises at least one of a primary account number (PAN), token, name, address, phone number, or e-mail address.

12. The computer device of claim 8, wherein the method further comprises:
   splitting the biometric template into a third fragment of the biometric template;
   generating a third random number associated with the third fragment of the biometric template; and
   transmitting, to a third template storage computer, the third random number and the third fragment of the biometric template.

13. The computer device of claim 8, wherein the computer is an access device.

14. The method of claim 8, wherein:
   during a user authentication step, the first fragment of the biometric template is retrieved, by a matcher computer, from the first template storage computer and the second fragment of the biometric template is retrieved, by the matcher computer, from the second template storage computer; and
   wherein the first fragment of the biometric template and the second fragment of the biometric template is combined, by the matcher computer, to determine whether the combined biometric template matches biometric data provided by the user.

15. A non-transitory computer readable medium, the non-transitory computer readable medium comprising computer executable code for executing a method, the method comprising:
   receiving, from a user, a biometric sample and user identifying information associated with the user;
   generating a biometric template based on biometric sample;
   splitting the biometric template into a first fragment of the biometric template and a second fragment of the biometric template;
   generating a first random number associated with the first fragment of the biometric template and a second random number associated with the second fragment of the biometric template, wherein the first random number is different than the second random number;
   transmitting, to a first template storage computer, the first random number and the first fragment of the biometric template;
   transmitting, to a second storage computer, the second random number and the second fragment of the biometric template; and
   providing the user identifying information, the first random number and the second random number to an identity (ID) manager computer, which passes the user identifying information to an ID splitting computer, wherein the ID splitting computer
   generates from the user identifying information a first user identifier and a second user identifier, wherein the first user identifier is different than the second user identifier, and transmits
   to the identity (ID) manager computer, the first user identifier and the second user identifier, wherein the identity (ID) manager computer transmits the first user identifier and the first random number to the first template storage computer and transmits the second user identifier and the second random number to the second template storage computer, and wherein the first template storage computer correlates the first user identifier with the first fragment of the biometric template based on the first random number and the second template storage computer correlates the second user identifier with the second fragment of the biometric template based on the second random number.

16. The non-transitory computer readable medium of claim 15, wherein the biometric sample comprises at least one of a voice sample, fingerprint, iris scan, hand geometry, earlobe geometry, or deoxyribonucleic acid (DNA) scan.

17. The non-transitory computer readable medium of claim 15, wherein:
   correlating the first user identifier with the first fragment of the biometric template comprises storing, in a database, a first record associating the first user identifier to the first fragment of the biometric template; and
   correlating the second user identifier with the second fragment of the biometric template comprises storing, in the database, a second record associating the second user identifier to the second fragment of the biometric template.

18. The non-transitory computer readable medium of claim 15, wherein the user identifying information comprises at least one of a primary account number (PAN), token, name, address, phone number, or e-mail address.

19. The non-transitory computer readable medium of claim 15, wherein the method further comprises:
   splitting the biometric template into a third fragment of the biometric template;
   generating a third random number associated with the third fragment of the biometric template; and
   transmitting, to a third template storage computer, the third random number and the third fragment of the biometric template.

20. The non-transitory computer readable medium of claim 15, wherein the biometric template is derived from facial data.

* * * * *

UNITED STATES PATENT AND TRADEMARK OFFICE
CERTIFICATE OF CORRECTION

PATENT NO. : 10,135,820 B2  
APPLICATION NO. : 15/783964  
DATED : November 20, 2018  
INVENTOR(S) : Kim Wagner Page 1 of 1

It is certified that error appears in the above-identified patent and that said Letters Patent is hereby corrected as shown below:

In the Claims

Column 15, Claim 1, Line 55 please remove "based on biometric sample" and insert -- based on the biometric sample --

Column 16, Claim 7, Line 64 please remove ""biometric template is" and insert -- biometric template are --

Column 17, Claim 8, Line 9-10 please remove "generating a biometric template based on biometric sample" and insert -- generating a biometric template based on the biometric sample --

Column 18, Claim 14, Line 20 please remove ""biometric template is" and insert -- biometric template are --

Column 18, Claim 15, Line 30-31 please remove "generating a biometric template based on biometric sample" and insert -- generating a biometric template based on the biometric sample --

Signed and Sealed this  
Twelfth Day of March, 2019

Andrei Iancu  
*Director of the United States Patent and Trademark Office*